United States Patent Office 2,949,469
Patented Aug. 16, 1960

2,949,469

PRODUCTION OF 3-INDOLEACETONITRILE FROM SUBSTITUTED INDOLES

James N. Coker and William H. Todd, Wilmington, Del., assignors to E. I. du Pont de Nemours and Company, Wilmington, Del., a corporation of Delaware No Drawing. Filed Aug. 4, 1958, Ser. No. 753,132

4 Claims. (Cl. 260—319)

This invention relates to the production of 3-indoleacetonitrile and is more particularly concerned with a process for producing it from substituted indoles.

3-indoleacetonitrile is known to be valuable as a plant growth hormone and in chemical syntheses. The compound is readily hydrolyzed to 3-indoleacetic acid, which is likewise known to be valuable for these uses. It is an object of this invention to provide a process for preparing 3-indoleacetonitrile from readily available starting materials in high yield. Other objects will become apparent from the specification and claims.

It has now been found that 3-indoleacetonitrile is readily prepared by reacting a 3-oxymethylindole, having the oxygen atom directly bonded to hydrogen, lower acyl or alkyl, with alkali metal cyanide in solution. The product can be recovered by evaporating the solvent and extracting the 3-indoleacetonitrile from the residue.

The preferred starting material is 1-acetyl-3-acetoxymethylindole, which is obtained in nearly quantitative yields by treatment of the readily available gramine with hot acetic anhydride and sodium acetate as disclosed by Leete and Marion, Canadian J. Chem., 31, 775 (1953). This compound can be used directly in the process of this invention, since the N-acetyl substituent is removed by formation of alkali metal acetate salt.

The process is useful for preparing 3-indoleacetonitrile from 3-indolylmethanol and the simple esters and ethers of this alcohol, including the 3-indolylmethyl alkyl ethers, so the reaction may be represented by the general equation,

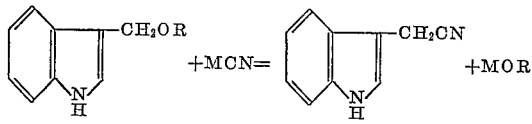

where R is hydrogen, lower acyl or alkyl and M is an alkali metal. The 1-acyl amides thereof are suitable as the acyl group is removed from the nitrogen atom with formation of potassium acetate, etc.

The reaction is preferably carried out by refluxing a solution of the reactants. Any inert solvent for the reactants can be used. A mixture of alcohol and water, such as substantially equal proportions of ethanol and water, is preferred because of their cheapness, but other suitable solvents include types represented by dimethyl formamide, 2-methoxyethanol and dimethylsulfoxide. The reaction temperature can be raised by the use of pressure to raise the boiling point of the solvent. The reactants can be used in a wide variety of proportions, although the alkali metal cyanide will normally be used in sufficient excess to convert all of the other reactants.

1-acetyl-3-acetoxymethylindole is converted to 3-indoleacetonitrile in at least 75% yield by refluxing it with an excess of sodium or potassium cyanide in 1:1 ethanol-water for 4 hours at atmospheric pressure. The yield may be improved by use of higher temperatures or longer reaction times.

The following example, in which parts are by weight, illustrates a preferred embodiment of the invention:

Example

A mixture of 46 parts 1-acetyl-3-acetoxymethylindole, 26 parts potassium cyanide, 235 parts ethanol and 300 parts water is refluxed gently for 4 hours at atmospheric pressure. Most of the solvent is then evaporated and 3-indoleacetonitrile is extracted from the residue with three portions of ether, using about 500 parts of ether each time. The ether extracts are combined, dried over sodium carbonate and the ether is removed by gentle heating. There is thus obtained 24 parts (77% yield) of crude 3-indoleacetonitrile product. The melting point of the trinitrobenzene adduct of this product is 138.5–139.5° C. and there is no depression of the melting point when mixed with an authentic sample of this derivative. Distillation of the crude 3-indoleacetonitrile under high vacuum gives a pure product having a boiling point of 155–163° C. at 0.10–0.15 mm. of mercury pressure.

Substitution of 3-indolylmethanol or 3-indolylmethyl ethyl ether for the 1-acetyl-3-acetoxymethylindole of the above example likewise gives 3-indoleacetonitrile.

Since many different embodiments of the invention may be made without departing from the spirit and scope thereof, it is to be understood that the invention is not limited by the specific illustrations except to the extent defined in the following claims.

We claim:

1. The process which comprises reacting a compound represented by the formula

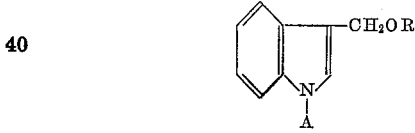

where A is a member selected from the group consisting of hydrogen and acetyl and R is a member selected from the group consisting of hydrogen, lower alkanoyl and alkyl, with alkali metal cyanide in solution to produce 3-indoleacetonitrile.

2. The process which comprises reacting 1-acetyl-3-acetoxymethylindole with alkali metal cyanide in solution to produce 3-indoleacetonitrile.

3. The process which comprises refluxing a solution of 1-acetyl-3-acetoxymethylindole and alkali metal cyanide to produce 3-indoleacetonitrile.

4. The process which comprises refluxing a solution of 1-acetyl-3-acetoxymethylindole and alkali metal cyanide in alcohol-water solvent to produce 3-indoleacetonitrile, evaporating the solvent, and extracting the 3-indoleacetonitrile from the residue.

References Cited in the file of this patent

UNITED STATES PATENTS

| | | |
|---|---|---|
| 2,222,344 | Bauer et al. | Nov. 19, 1940 |
| 2,715,129 | Hamlin | Aug. 9, 1955 |
| 2,766,255 | Pfister et al. | Oct. 9, 1956 |